United States Patent [19]

Fruda et al.

[11] 3,971,857
[45] July 27, 1976

[54] MULTIFUNCTIONAL SWEETENING COMPOSITION

[75] Inventors: Ivan Fruda, Pleasantville,; Jerome Francis Trumbetas, Tarrytown, both of N.Y.

[73] Assignee: General Foods Corporation, White Plains, N.Y.

[22] Filed: Nov. 21, 1973

[21] Appl. No.: 418,015

[52] U.S. Cl. .............................. 426/548; 426/658
[51] Int. Cl.² ........................................ A23L 1/236
[58] Field of Search .......... 426/212, 213, 215, 217, 426/380, 364, 548

[56] References Cited
UNITED STATES PATENTS

| | | | |
|---|---|---|---|
| 2,719,179 | 9/1955 | Mora et al. .......................... | 260/209 |
| 3,753,739 | 8/1973 | Cella et al. ........................ | 426/217 X |
| 3,761,288 | 9/1973 | Glicksman et al. ............. | 426/217 X |
| 3,766,165 | 10/1973 | Rennhard ....................... | 426/213 X |

*Primary Examiner*—A. Louis Monacell
*Assistant Examiner*—Esther L. Massung
*Attorney, Agent, or Firm*—Daniel J. Donovan; Bruno P. Struzzi; Doris M. Bennett

[57] ABSTRACT

A low calorie, low-hygroscopic, quick-dissolving sweetening composition is obtained by co-drying a solution of a dipeptide sweetening agent with polyglucose.

9 Claims, No Drawings

MULTIFUNCTIONAL SWEETENING COMPOSITION

BACKGROUND OF THE INVENTION

The present invention relates to a sweetening composition having the desirable sweetness intensity and rate of solubility of sucrose without the accompanying caloric content. More specifically, this invention pertains to a sweetening composition having the above mentioned properties which comprises a dipeptide sweetener and polyglucose and the method of making the same.

It is well known that the dipeptide compounds of this invention set forth principally in U.S. Pat. Nos. 3,475,403 issued Oct. 28, 1969; 3,492,131 issued Jan. 27, 1970; 3,695,898 issued Oct. 3, 1972; and more recently 3,714,139 issued Jan. 30, 1973 possess intensely sweet and low calorie properties. It has also been determined, however, that these compounds as a class have a markedly slower rate of solution than sucrose making their use in food and beverage systems impractical notwithstanding their attractiveness as low calorie sweetening compounds.

Methods for improving solubility which are known in the art could foreseeably function effectively with these compounds such as admixing the same with fumaric and/or adipic acid, incorporating a surface active agent or combining these dipeptides with certain dry bulking agents which may or may not affect their solubility. However, these compounds do not serve the purpose of this invention which is to produce a sweetening composition having not only a satisfactory rate of solubility and low calorie content, but also a "keeps well" property due to low hygroscopicity. At the same time, addition of a compound which would impart any type of aftertaste resulting in an alteration of the natural sweet properties of the dipeptide is highly undesirable and therefore a bland bulking agent would be preferred.

In the light of a great demand for new functional sweetening agents, the invention herein presented fulfills the above mentioned criteria so important from a food technological as well as consumer point of view.

SUMMARY OF THE INVENTION

It has been found that polyglucose, a low-calorie synthetic glucan prepared by acid catalyzed polymerization under vacuum ($10^{-5}$ to 10 mm Hg) at elevated temperatures (100°C to 170°C) first taught by British Pat. No. 1,182,961 issued Mar. 4, 1970, U.S. Pat. No. 3,325,296 and *Advances in Cabohydrate Chemistry*, "Chemical Synthesis of Polysaccharides" Vol. 21, 1966, when co-dried with a dipeptide sweetener serves the multifunctional purpose of this invention. Explicitly, when polyglucose and L-aspartyl-L-phenylalanine methyl ester, hereinafter referred to as APM, are either dry mixed in a pre-defined ratio and placed in solution, or solutions of the same combined to give the pre-defined ratio of APM to synthetic glucan and thereafter co-dried by either drum drying, freeze-drying, spray-drying or similar such methods, a dry sweetening composition which is low in calories, low in hygroscopicity, devoid of unpleasant aftertaste and at least 2 to 6 times faster dissolving than APM alone is obtained.

Incorporation of dipeptide sweeteners, preferably APM with other carbohydrates such as glucose, fructose, invert sugar, dextrin and the like by known co-drying techniques serves to increase the sweetness of the resulting composition by reason of contributing its own sweetness of the system and at the same time prevents deliquescense of these carbohydrates under moist conditions due to the high hygroscopicity of the same. Although combining dipeptide sweeteners with these carbohydrates results in a multi-functional composition of increased sweetness and lowered hygroscopicity, these carbohydrates are high in calorie content and have characteristic flavor notes of their own. Since the primary object of this invention is to produce a multi functional sweetening composition which is also low in calories and devoid of aftertaste, reference will henceforth be made to the use of only polyglucose.

Since polyglucose is highly hygroscopic, and the dipeptides of this invention have extremely poor solubility the multifunctional sweetening formulation derived results from the retention of only the desirable qualities of each starting material. The ability of APM to eliminate the tendency of this synthetic polymer to deliquesce under moist conditions can be explained by the hydrophobic character of the benzene ring on the dipeptide molecule which functions to reduce the hygroscopicity of the polymer by reason of contributing its own hydrophobicity to the system. Thus, the higher the ratio of dipeptide to polyglucose the less hygroscopic the system becomes. This does not involve any chemical interaction between the two components, however, and therefore, no relinquishment of sweetness by the dipeptide is experienced. Alternatively, the rate of solubility of the dipeptide, specifically APM is increased by relying upon the innately high rate of solubility of polyglucose. Thus the higher the ratio of polyglucose to dipeptide, the more rapidly soluble the sweetening composition becomes. Since the interests are conflicting in terms of acquiring the most desirable degree of solubility and hygroscopicity, the dipeptide and polyglucose should be in sufficient proportion to produce a sweetening composition which is both fast dissolving and low in hygroscopicity.

This invention finds utility as a non-hygroscopic table sweetener or in virtually any foodstuff where characteristic low calorie content, rapid solubility and "keeps-well" properties are desired.

Accordingly, it is the principle object of this invention to produce sweetening composition which is low in calories, rapidly soluble, non-hygroscopic and devoid of unpleasant after-taste due to the addition of compounds known to increase dispersibility and/or lower hygroscopicity.

The above and additional objects of this invention are accomplished by co-drying a solution of a dipeptide sweetener and an edible bland low calorie polysaccharide. The invention is predicated upon the discovery that when the dipeptide and polyglucose are in a defined ratio range, it is possible to produce a dry sweetening composition which when placed in solution and dried has the beneficial properties of rapid solubility and low-hygroscopicity in addition to being low in calories.

The features of this invention which are believed to be novel are distinctly set forth and claimed in the concluding portion of this specification.

DESCRIPTION OF THE INVENTION

The multifunctional sweetening composition of this invention is prepared by co-drying a solution of a dipeptide sweetener with polyglucose. The term "dipeptide" as used throughout this invention is intended to refer to both the unmodified dipeptide sweeteners and the non-toxic soluble salts thereof. The dipeptide salts increase the rate of solubility of the dried formulation but are more hygroscopic than the unmodified dipeptide and lend an acid flavor to the final product. Therefore, employing a sweetening amount of these salts in for example, fruit-type beverages or the like where an acidulous note is acceptable is preferred only where a faster rate of solubility is of more import than the accompanying increase in hygroscopicity. low-hygroscopic The solution may be prepared by simply homogenously co-mixing the artificial sweetening agent with polyglucose and combining the same into one homogenous solution or by similar known manners. The salient point of this invention is that when the sweetener and polyglucose are in sufficient proportion to one another, the dry composition demonstrates both the desirable rate of solubility of the polyglucose and the hydrophobicity of the sweetener when placed in solution and co-dried. Concentrations of these compounds are usually in the range of about 1:19 to about 3:7 by weight of the dipeptide to polyglucose about 1:3 to about 1:4 preferred. It should be obvious to those skilled in the art that variations from this ratio range may be had and a low calorie, sweet composition be derived. However, it has been found that the aforementioned ranges serve to produce a low calorie sweetening composition which is in addition low-hygroscopic and rapidly soluble in aqueous systems. Consequently, appreciable variances from the aforementioned ranges will not produce an artificial sweetening composition having all of the desirable properties previously set forth.

As the sweetness level of the multifunctional formulation may be adjusted according to the specific requirements of the foodstuff by changing the ratio of sweetener to polyglucose, so may the bulk density of the end product be adjusted by selecting the proper drying procedure. Freeze-drying produces the lowest bulk density product and eliminates the possibility of thermal degradation but is the most expensive means of co-drying the composition. However, since this method does produce a final product with the fastest rate of solubility in terms of other drying methods, it is preferred where rate of solubility is a prime consideration. In addition, the possibility of thermal degradation of the dipeptide is eliminated. In terms of deriving a matrix appropriate for use as a table sweetener, it is important that the drying conditions be carried out by a method which effectively bulks the matrix formed as by achieving a distinct blistering effect by spray-drying the solution under conditions which result in a bulk compatible with like sweetening effects of an equal volume of sucrose. Such a product is preferably produced by spray-drying. However, it may also be produced by drum drying, either atmospherically or under a vacuum. Desirably, the spheres produced by spray drying are less dusty, more glossy in appearance and more suggestive of a crystalline table sugar product than the drum dried product which has a relatively extreme degree of dustiness. The intended bulk of the product is a matter within the skill of the calling. Thus, it is within the scope of this invention to agglomerate the dry product to achieve a bulking effect, which agglomeration may be practiced by a grinding of a spray-dried or otherwise dried matrix material and then an agglomeration of discrete particles. Known methods of agglomeration which may be conducted in the absence of moisture are preferred since the dipeptide sweeteners of this invention tend to decompose after prolonged exposure to the same.

In all instances, the better quality product especially from a hygroscopicity and deliquescence point of view can be prepared when polyglucose which has been purified as by organic solvent precipitation or ultrafiltration is employed. The ultrafiltrated polyglucose is preferred not only because of the undesirability of using large amounts of flammable solvents but mainly due to the fact that the molecular size of the product can more easily be controlled making it possible to eliminate virtually all of the low molecular weight reaction products. Such products contain appreciable amounts of reducing groups which when present could react with the free amino group of the dipeptide sweetener to cause a reduction in sweetness. Available polyglucose is made by controlled polymerization of glucose, sorbitol and polycarboxylic acid in a respective ratio of 89:10:1 and is available in two unpurified forms — an acid-fused form having a pH of approximately 3.2 and a bleached neutralized form with a pH of 7.5. The latter surprisingly demonstrates a faster rate of solubility when co-dried with APM than the acid form and is, therefore, preferred. The average molecular weight values are between 3,000 and 18,000 and contain 0.1 to 10 mole per cent of polycarboxylic acid ester groupings. Generally, the low molecular weight fragments present in the unpurified polyglucose account for the high degree of hygroscopicity. Consequently, when this synthetic polymer is purified as for example, by ultrafiltration where such undesirable low molecular weight fragments are removed, the hygroscopicity of polyglucose is reduced making it possible for higher ratios of polyglucose to dipeptide to be utilized without an accompanying increase in hygroscopicity. In addition, where a phosphoric acid catalyzed polyglucose is utilized, a significantly improved rate of solubility is achieved. The phosphoric acid catalyzed polyglucose, may generally be prepared by dispersing glucose in water which solution is heated for complete dissolution of the glucose. Either prior to heating the solution, during the dissolution of the glucose or subsequent to having obtained a homogenous solution, a catalytic amount of phosphoric acid is added to the solution to keep the solution to a pH of preferably about 1.8 to about 2.4. The solution is thereafter dried in a vacuum-type dryer such as a rotary evaporator to form a thick syrup having a moisture content of usually no higher than 10%. The utilization of vacuum heating is necessary in order to effect the desirable degree of polymerization which is usually about 10 to about 100 anhydroglucose units. The resultant material is then dissolved in water and preferably neutralized by adding a neutralizing amount of alkaline solution. The solution is preferably ultrafiltrated in order to remove low molecular weight fragments prior to drying by means of spray drying, freeze-drying, drum-drying or the like.

Accordingly, for reasons of rate of solubility and stability, the preferred embodiment of this invention is to co-freeze-dry a solution of L-aspartyl-L-phenylalanine methyl ester (APM) with an ultrafiltrated neutralized phosphoric acid — catalyzed polyglucose at a ratio of about 1:3 to about 1:4 by weight of APM to polyglucose.

Those skilled in the art will be aware of various flavoring, sweetening and coloring ingredients which can be employed alone or in combination with the dipeptide sweetener and/or polyglucose to produce products which would only appear to be novel.

The following examples are presented for the purpose of further illustrating and explaining the present invention and are not to be taken as limiting in any sense.

In all examples where the rate of solubility of the resultant composition is evaluated, APM is present in solution at an overall concentration of 1%, and the solutions are stirred at room temperature by means of a magnetic stirring plate.

EXAMPLE I 2.5 g Of L-aspartyl-L-phenylalanine methyl ester (APM) and 7.5 g non-purified polyglucose N (neutral form) prepared by polycarboxylic acid catalyzed polymerization are dissolved in 200 ml water at room temperature and then freeze dried.

The APM/polyglucose freeze-dried sample was compared to a polyglucose control in terms of hygroscopicity. Both samples were exposed to the atmosphere at a relative humidity of 70% at 90°F for 7 days and measured for moisture uptake. Moisture absorption in the APM/polyglucose sample was 15% lower than the control and occurred during the initial 2 to 3 day period. The control deliquesced during the initial 24 hours. At the conclusion of the 7 day period, the polyglucose was in a liquid state while the APM/polyglucose sample, while not devoid of moisture, was still a partially dry flowable mass. The water uptake by both samples ceased after one week storage and the appearance of the samples did not change during additional three week storage.

EXAMPLE II

A sample of APM/polyglucose as prepared in Example I was tested for its rate of solubility as against an APM control. The test was carried out at a 1% concentration based on APM in room temperature water.

| APM | 10+ minutes |
|---|---|
| APM/Polyglucose | 1 min. 40 sec. |

EXAMPLE III 2.5 g APM and 7.5 g polycarboxylic acid-catalyzed non-purified polyglucose A (acid form) dissolved in 200 ml water at room temperature and the solution is freeze-dried.

The polyglucose control and APM/polyglucose test samples were stored for 7 days at 90°F and a relative humidity of 70%. The test sample containing the acid form polyglucose had a moisture uptake which was 25% lower than the control which occurred in the first 3 days of the storage period. As in Example I, the control sample deliquesced after 24 hours. At the conclusion of the 7 day period, the control was completely liquified and the test sample, although less moist than the control had some degree of caking and could not be considered an absolutely free flowing mass.

EXAMPLE IV

A sample of the APM polycarboxylic-acid-catalyzed polyglucose prepared in Example III was evaluated for its rate of solubility as against an APM control. The test was conducted at room temperature water at a concentration of 1% based on APM. The APM/polyglucose sample was only about 2 times faster to dissolve than APM alone indicating that the acid form of polyglucose is not preferred.

EXAMPLE V

Polyglucose N solution prepared by polycarboxylic acid polymerization is ultrafiltrated through an "Amicon" membrane UM 2 (1,000 molecular weight cut-off point) in order to remove the low molecular weight fragments comprising mostly unreacted material and by-products of polymerization and neutralization. The solution is then dried by spray drying, freeze drying or drum drying. 7.5 g Of this dried material is dissolved with 2.5 g APM in 200 ml of room temperature water. The solution was freeze-dried and thereafter stored with an ultrafiltrated polyglucose N control for a period of 8 days at 90°F and a relative humidity of 70%.

The APM/ultrafiltrated polyglucose test sample remained free flowing after 8 days while the ultrafiltrated polyglucose control deliquesced after 48 hours. After 8 days of storage, water uptake by both samples ceased, the moisture uptake by the test sample having been about 80% lower than the control. Despite the minor amount of moisture absorption that did take place, the APM/polyglucose sample remained free flowing.

Freeze-dried samples of APM and APM/ultrafiltrated polyglucose were tested for their rate of solubility in room temperature water and at 1% concentrations

| APM | 10 minutes |
|---|---|
| APM/polyglucose | 1 min. 50 sec. |

EXAMPLE VI 100 g Of glucose is dispersed in 150 ml of water. The solution is heated to slightly above room temperature in order that the glucose dissolve completely. Five drops of concentrated phosphoric acid is added to the mixture which results in a 2.0 pH solution. The entire solution is then evaporated on a rotary evaporator to form a thick syrup. The syrup is heated in a vacuum oven at 125°C and $10^{-2}$ to $10^{-3}$ mm Hg for about 10 hours. The bright yellow glossy material is then dissolved in water, adjusted to pH 6.5 by adding several drops of sodium hydroxide solution.

An aqueous solution containing 30% APM and 70% polyglucose prepared by this manner is formulated and thereafter freeze-dried.

A dry APM/polyglucose sample placed in a closed jar and stored at room temperature for 2 years remained stable and sweet.

An APM control and the APM/polyglucose test sample were evaluated for their rate of solubility and the following results derived:

| APM | 10+ minutes |
|---|---|
| APM/polyglucose | 1 min. |

The test sample did not deliquesce when exposed to an atmosphere of 85% relative humidity and 90°F for 12 days although the water uptake was 20% as compared to a polyglucose control which did deliquesce under the same test conditions.

What is claimed is:

1. A process for producing a low calorie sweetening composition which is readily soluble in aqueous systems, low in hygroscopicity and devoid of any aftertaste which alters the sweetness thereof which comprises:
   a. forming an aqueous solution of glucose;
   b. heating the glucose solution until the glucose is completely solubilized;
   c. adding a catalytic amount of phosphoric acid to the heated solution in order to catalyze the polymerization of the glucose;
   d. evaporating the heated solution to form an acidified glucose syrup;
   e. vacuum heating the acidified glucose solution to obtain a polyglucose residue;
   f. forming an aqueous solution of dipeptide sweetener with the polyglucose in a respective weight ratio range of about 1:19 to about 3:7.
   g. drying the dipeptide sweetener/polyglucose solution.

2. The process of claim 1 wherein the dipeptide is L-aspartyl-L-phenylalanine methyl ester.

3. The process of claim 2 wherein the catalytic amount of phosphoric acid is added to bring the solution to a pH of about 1.8 to about 2.4.

4. The process of claim 2 wherein the polyglucose residue is dissolved in water and neutralized prior to combining with the dipeptide.

5. The process of claim 3 wherein the neutralized polyglucose solution is ultrafiltrated.

6. The process of claim 1 wherein the dipeptide sweetener and polyglucose are in the respective weight ratio range of about 1:3 to about 1:4.

7. The process of claim 1 wherein the dipeptide sweetener/polyglucose is freeze-dried.

8. The process of claim 1 wherein the dipeptide sweetener/polyglucose solution is dried to a final moisture content of no higher than 10%.

9. The product of the process according to claim 1.

* * * * *